(12) United States Patent
Wolf et al.

(10) Patent No.: US 11,912,008 B2
(45) Date of Patent: Feb. 27, 2024

(54) FILM AND PACKAGING FOR GAS OR VAPOR DECONTAMINABLE PACKAGING AND METHODS DECONTAMINATING PACKAGES

(71) Applicant: SCHOTT PHARMA AG & CO. KGAA, Mainz (DE)

(72) Inventors: Patrick Wolf, St. Gallen (CH); Gregor Fritz Deutschle, Idstein (DE); Volker Rupertus, Alzey (DE)

(73) Assignee: SCHOTT PHARMA AG & CO. KGAA, Mainz (DE)

( * ) Notice: Subject to any disclaimer, the term of this patent is extended or adjusted under 35 U.S.C. 154(b) by 378 days.

(21) Appl. No.: 16/731,615

(22) Filed: Dec. 31, 2019

(65) Prior Publication Data
US 2021/0053313 A1    Feb. 25, 2021

(30) Foreign Application Priority Data
Aug. 20, 2019 (EP) ..................... 19192633

(51) Int. Cl.
*B32B 5/02* (2006.01)
(52) U.S. Cl.
CPC ........ *B32B 5/022* (2013.01); *B32B 2307/724* (2013.01); *B32B 2307/7265* (2013.01)
(58) Field of Classification Search
CPC .......................... B32B 5/022; B32B 2307/724
USPC ....................................... 428/35.2
See application file for complete search history.

(56) References Cited

U.S. PATENT DOCUMENTS

| 4,550,546 | A |   | 11/1985 | Raley |   |
|---|---|---|---|---|---|
| 6,326,450 | B1 | * | 12/2001 | Shipston | C09J 7/35 526/318.4 |
| 2001/0023001 | A1 | * | 9/2001 | Weiss | B65D 75/5855 428/35.2 |
| 2003/0165663 | A1 | * | 9/2003 | Christopherson | B32B 27/08 428/137 |
| 2006/0104856 | A1 | * | 5/2006 | Farrell | B09B 3/0075 422/1 |
| 2021/0053313 | A1 | * | 2/2021 | Wolf | B32B 7/14 |

OTHER PUBLICATIONS

ASTM F1608-16, "Standard Test Method for Microbial Ranking of Porous Packaging Materials (Exposure Chamber Method)" 9 Pages.

* cited by examiner

*Primary Examiner* — Betelhem Shewareged
(74) *Attorney, Agent, or Firm* — Ruggiero McAllister & McMahon LLC

(57) ABSTRACT

Disclosed are films and a packaging for gas or vapor decontaminable packaging applications and a method for creating a sterile packaging using the same. These films are particularly useful for sterile storage and transport of objects for medical, pharmaceutical or cosmetic uses, in particular of sterile pharmaceutical primary packaging means, like vials, ampules, syringes, or cartridges. Said film comprises at least a layer of a selectively permeable non-woven, a layer of a punctured film, and an adhesive which can be activated by energy transmission. Optionally it comprises further film layers. The method for creating a sterile packaging comprises the step of hermetically closing the packaging by activating the adhesive thereby making the non-woven impermeable.

16 Claims, 3 Drawing Sheets

FILM AND PACKAGING FOR GAS OR VAPOR DECONTAMINABLE PACKAGING AND METHODS DECONTAMINATING PACKAGES

CROSS REFERENCE TO RELATED APPLICATIONS

This application claims benefit under 35 USC § 119 of European Application 19192633.6 filed Aug. 20, 2019, the entire contents of which are incorporated herein by reference.

BACKGROUND

1. Field of the Invention

The present invention relates to films and a packaging for gas or vapor decontaminable packaging applications and a method for creating a decontaminated packaging using the same. These films are particularly useful for sterile storage and transport of objects for medical, pharmaceutical or cosmetic uses, in particular for sterile pharmaceutical primary packaging means, like vials, ampules, syringes, or cartridges.

2. Description of Related Art

When creating a packaging for sterile storage and transport of objects it is an essential requirement that the packaging is sterilizable and able to maintain the sterile atmosphere within the packaging. Particularly for sterile pharmaceutical primary packaging means, like vials, ampules, syringes, or cartridges, a typical packaging for the transport from a manufacturer of pharmaceutical primary packaging means to a pharmaceutical company using the same comprises container in the form of a tub or tray holding a multitude of the primary packaging means which is sealed with a non-woven and further enclosed in one or two bags. The non-woven is usually a flash spun plexifilamentary film-fibril structure made of high density polyethylene, which is known under the trademark Tyvek® of the company DuPont, or a spunbonded very fine filaments non-woven. These selectively permeable non-wovens allow for the sterilization by means of gas or vapor, like ethylene oxide, steam, or hydrogen peroxide, after closing the packaging. Hence, also at least one wall of the outer enclosing bags comprises or consists of such a non-woven. While being permeable for the sterilizing gas or vapor, the selectively permeable non-woven is essentially impermeable for microbes and thus forms a microbial barrier. The microbes get stuck in the non-woven filament structure. Depending on the type and density of the non-woven a different sterility assurance level can be achieved, but there is always some amount of microbes getting through. Hence, these non-wovens should be called only essentially impermeable for microbes.

At the pharmaceutical company, the sterile primary packaging means are unpacked and filled under controlled, sterile conditions. This involves so-called disinfection and/or decontamination steps at the transition from higher to lower classified clean room classes. These can, for example, be a biological decontamination using e-beam, hydrogen peroxide or wiping with an alcohol solution. Before the tub or tray is transferred to the aseptic area where the Tyvek® or other non-woven sealing film is removed and the active pharmaceutical ingredient is filled into the primary packaging means, a further decontamination step takes place. This is necessary because the sterility of the outside of the tub or tray cannot be guaranteed.

In the context of the present application, decontamination is defined as an umbrella term for reducing the amount of microbes and biological agents, such as fungi, bacteria, viruses, spore forms, prions, unicellular eukaryotic organisms, etc. The special terms disinfection and sterilization differ in the amount of reduction of these. While disinfection only reduces the amount of said contaminants, sterilization effectively kills, deactivates, or eliminates all forms of life and other biological agents which are present, i.e. a reduction of 100%. Hence, disinfection is less effective than sterilization. The required level of reduction is determined by the intended application.

While the non-woven seal on the tub or tray is validated as a sterile barrier, at present it is not possible to prove integrity of the packaging without destroying it. There is a permanent gas exchange between the environmental atmosphere and the atmosphere within the bags through the porous non-woven parts of the packaging.

Further, when using non-woven seal on trays or tubs, there is a risk of residual amounts of hydrogen peroxide within the trays or tubs, if a hydrogen peroxide treatment is executed for decontamination. This is particularly dangerous in the case of filling the medical primary packing means with sensitive biological medicaments which tolerate only very low trace amounts of hydrogen peroxide. For avoiding residues of hydrogen peroxide, today there still does not exist a satisfactory solution. Sometimes a gas-impermeable film is sealed onto the non-woven. However, this bears the risk of enclosing non-sterile surfaces between the non-woven and the gas-impermeable film and of a non-complete sealing. Moreover, these additional steps have to be carried out manually and, hence, are impeding a fully automatic handling of the packaging means while introducing them in the clean room and bear a further risk of contamination.

SUMMARY

The object of the present invention has been to provide a packaging which overcomes these drawbacks of the prior art. In particular, it has been one object to provide a packaging, which allows for a non-destructive integrity check. A further object has been to provide a packaging, which is able to avoid hydrogen peroxide contamination of the packaged goods when a hydrogen peroxide decontamination step is executed.

In an embodiment, the invention relates to a film for gas or vapor sterilizable packaging applications consisting of or comprising at least in sequence from outside to inside of the packaging: (a) a first layer of film being essentially impermeable for the sterilizing gas or vapor, having a first needling, perforation and/or cut pattern; (b) an adhesive layer which can be activated by energy transmission, covering the entire surface of a layer underneath or being arranged in patterns; and (c) a layer of a selectively permeable nonwoven being essentially impermeable for microorganisms.

In this application, a "selectively permeable non-woven" is to be understood as being permeable for gases or vapors but being essentially impermeable for microbes and microorganisms and thus forming a microbial barrier. The term "essentially impermeable for microbes" within this context refers to a Microbial Barrier measured according to ASTM F1608-16 of 2-6 Log Reduction Value (LRV).

A typical packaging application for which the films according to the invention are intended to be used comprises as goods to be packaged sterile pharmaceutical primary packaging means, like vials, ampules, syringes, or cartridges. These primary packaging means are usually placed in a tray or a tub, which are then sealed with a lidding film according to the invention. Thereafter, the sealed tub or tray is further enclosed in one or two bags.

Another application of the film according to the invention is for these further outer bags which comprise at least in part a film according to the invention. It is also possible to combine these two applications and use a film according to the invention as a lidding film for the trays or tubs as well as the surrounding bags.

It has been found that, instead of sealing a gas-impermeable film onto the non-woven areas of the packaging for hermetically closing the packaging after decontamination, a sealing by means of an adhesive, which can be activated by energy transmission is far more effective than sealing additional films onto these areas since it can be done right after decontamination without further manual handling. In particular, there is no risk of entrapping contaminated surfaces within the packaging. The closed packaging can be decontaminated as usual through the non-woven areas. Once the decontamination is completed, the adhesive is activated by energy transmission and closes the needling, perforation and/or cut pattern of the film and/or the pores of the non-woven. After this hermetic sealing it is possible to execute a decontamination step of the tray or tub with hydrogen peroxide during unwrapping of the package without contamination of the packaged goods.

If the film according to the invention is used as a component of the enclosing bags, it is possible to check the integrity of the packaging in a secure and non-destructive way.

The adhesive may be chosen such that it is in its non-activated state permeable for the decontaminating gas or vapor and gets impermeable after activation. Then it can be applied covering the whole area of the non-woven and/or of the film layer. This will, however, decrease the permeability of the non-woven and/or of the film layer and consequently increase the time required for exposure to the decontaminating atmosphere. For this reason it is more preferred to apply the adhesive not on the whole area but only in patterns. In either case, the amount of adhesive is to be chosen such that it is enough to reliably seal the needling, perforation and/or cut pattern of the film and/or the porosity of the non-woven layer. If it is applied in patterns, its type and flow properties further have to be chosen such that it can spread over the whole surface during activation.

Further aspects concern the binding between the film and the non-woven layer. For fixating the two layers of the non-woven and the film onto each other there are two options. Either on separate areas between the layers a standard lamination adhesive is applied, for example in a grid-like shape or small patches, to achieve the binding while the rest of the surface is treated with the activatable adhesive or only an activatable adhesive is used and during production of the layer composite predefined areas are selectively activated. The latter may for example be done by means of masks, screens, or tools.

In this embodiment with a layer sequence a)-b)-c), the permeability of the packaging as a whole for the sterilizing gas or vapor is achieved by apertures in the film that is otherwise impermeable for the sterilizing gas or vapor. Before activation of the adhesive, the gas or vapor can enter the packaging through these apertures and the porous non-woven. After activation of the adhesive, the film is bonded to the non-woven layer and the apertures and pores are sealed. This essentially corresponds to the presently applied procedure of manually sealing an additional film layer to the outside of the non-woven layer or areas of the packaging. However, there is a minimized risk of entrapping contaminations between the film and the non-woven due to the fact that these two layers are already combined before decontamination. Moreover, activation of the adhesive can be done directly within the decontamination chamber.

An alternative embodiment is also contemplated having a layer sequence of b)-a)-c), i.e. having the adhesive positioned on the outside of the packaging. However, this alternative is less preferable since the adhesive will not be able to further bond the film layer to the non-woven layer thereby closing the pathways for the sterilizing gas within both permeable layers. And with the adhesive on the outside it has to be ascertained that once activated nothing touches the outside of the packaging until the adhesive is cured.

In a further embodiment, the film further comprises: (d) a second layer of film being essentially impermeable for the decontaminating gas or vapor, having a second needling, perforation and/or cut pattern being incongruent with the first pattern, and being arranged between adhesive layer b) and layer of selectively permeable non-woven c).

In this preferred embodiment with a layer sequence a)-b)-d)-c), the hermetic sealing of the structure is effected by activation of the adhesive between the two outer film layers. Regarding the choice of the adhesive and the surface covered by it the same considerations as for the embodiment described above apply. It is important that the first and second needling, perforation and/or cut patterns are incongruent. This can either be achieved by using two different patterns or by using the same pattern but shifting the position. Preferably, there are no intersecting patterns between the two layers in order to avoid a direct linear path from outside to inside of the film. Patterns which have proven themselves to be useful for this purpose are, for example, labyrinth-like patterns, comb-like patterns, or sufficiently spaced apart stripe patterns.

Regarding the needling, perforation and/or cut patterns used in the two film layers of this embodiment there exist various options for arranging them. They may be arranged over the whole surface of the films in an intermeshing style when viewed through the combined films, like described above. This has the advantage of very short paths to travel for the decontaminating gas or vapors between the two film layers and, hence, an increased breathability of the packaging. However, the mechanical strength of the film layers decreases with the density of the patterns. For this variant it is also possible to cover only limited areas of the films creating a window-like surface which allows the decontaminating gas and vapors to enter the package only in these predefined areas.

As an alternative, the needling, perforation and/or cut patterns may be arranged in separate areas of the combined film layers. For example, the patterns may be arranged in the first film to cover only an area on the left side of the package and in the second film to cover only an area on the right side of the package while the middle of the package contains no patterns at all.

This embodiment unites different advantages over the other embodiment. Since hermetic sealing of the structure is effected between the two films which are impermeable for the decontaminating gas or vapor, the reliability and durability of the sealing is better than on the porous non-woven. Further, the surfaces of the films are smoother than the rough non-woven surface, particularly when using a cut pattern. As a consequence it is easier to achieve a hermetic sealing. And finally, the gas exchange rate will be better because the porosity of the non-woven will not need to be decreased as much as in the other embodiments by the application of the adhesive. It will suffice to apply just enough of a standard lamination adhesive to securely fix the layers together, whereas in the other embodiments the amount of adhesive has to be sufficient for covering the whole surface in order to effect sealing.

In variants of this embodiment the first layer of film a) and the second layer of film d) form a laminated structure or are joined to each other only at parts of their surface, particularly at their peripheral surface areas. While the films can be fixed on each other like in a laminated film wherein the gas and vapor permeability is either achieved by a permeable adhesive which can be activated or by a standard lamination adhesive which does only partially cover the surface, it is also possible to join the layers only at parts of their surface leaving the majority of the layers surfaces non-bonded. The latter is preferably done by sealing the film layers together around the edges like in a pouch.

Activation of the adhesive layer by energy transmission can be effected through heat, UV irradiation, IR irradiation, induction, and/or microwave irradiation. The type of energy transmission is selected to fit the type of adhesive. The adhesives may, for example, be a hot melt adhesive or a reactive system, like polyurethane or poly(meth)acrylate adhesives. Reactive systems usually contain an additive, such as a photoinitiator or a radical initiator, and can thus be activated by UV or IR radiation or heat. A system which can be activated by induction typically contains a nano-scaled ferromagnetic additive. Heat sealable adhesives can, for example, be based on ethylene-vinyl acetate copolymers or ionomers.

In a particularly preferred embodiment, the adhesive is a hot melt heat sealable adhesive system containing additives which are responsive to the energy transmission.

In an embodiment, the selectively permeable nonwoven is a flash spun plexifilamentary film-fibril structure or a spunbonded very fine filaments nonwoven. Preferably, the diameter of the very fine filaments is in either case in the range of 0.5-10 µm. One example of such a non-woven material is Tyvek® of the company DuPont. A particularly suitable type for this application is Tyvek® 1073B.

Preferably, the selectively permeable nonwoven is made of high density polyethylene (HDPE), polypropylene (PP), or polyethylene terephthalate (PET).

In some embodiments, the adhesive may be arranged in a positive or negative dot pattern, dash pattern and/or line pattern which is incongruent with the first and second needling, perforation and/or cut pattern. Positive and negative pattern is to be understood as an adhesive pattern consisting of said dots, dashes and/or lines (positive pattern) or consisting of a full area adhesive layer with the dots, dashes and/or lines left uncovered (negative pattern), respectively. This allows for a tailoring of the relation of the adhesion and the permeation structure closing capabilities to the permeability of the non-woven and/or film layers before activation of the adhesive.

The patterns can be created by different methods. Preferably, they are created by a printing technology, such as (roto)gravure printing, offset printing, or screen printing. For line patterns also coating technologies may be applied, such as Mayer rod coating or reverse roll coating.

Preferably, the film of the first and/or second layer comprises or is made of polyethylene, polypropylene, polyamide 6, polyethylene terephthalate or their blends and/or copolymers. Especially the polyamide 6 and polyethylene terephthalate films further improve the durability of the packaging and provide an oxygen barrier. In cases where transparency of the packaging is not required the film may also consist of an aluminum composite film in order to provide an excellent oxygen barrier.

In embodiments, the first and/or second needling, perforation and/or cut pattern is selected from labyrinth-like patterns, comb-like patterns, and stripe patterns. These patterns can very effectively be arranged without intersecting apertures in the two layers and, when arranged with a suitable offset or a negative layout, possess a good gas and vapor permeability and are very reliably hermetically sealable.

The invention further relates to a packaging for decontaminated packaging of objects for medical, pharmaceutical or cosmetic uses comprising at least in part a film according to the invention. Preferably, these objects are sterile pharmaceutical primary packaging means, like vials, ampules, syringes, or cartridges.

In embodiments, the packaging comprises a tub, optionally comprising a nest, or a tray, which are sealed with a film comprising at least in part a film according to the invention. Preferably the sealed tub or tray is further packaged in at least one bag or pouch comprising at least in part a film according to the invention.

In other embodiments, the packaging comprises a tub, optionally comprising a nest, or a tray, which is enclosed by at least one bag or pouch comprising at least in part a film according to the invention.

The packaging according to the invention does not exclusively have to be made of the films according to the invention. Like in prior art, where the bags, for example, are made of a layer of a non-woven on one side and a layer of impermeable film on the other side, the packaging according to the invention may use the film according to the invention as a replacement for the non-woven layer on one side while using the usual film layer on the other side. Moreover, window-like structures known in prior art having only a limited permeable area may also be replicated with a film according to the invention. The film according to the invention simply replaces the pure non-woven layers in order to provide the package with the ability to be hermetically sealed after decontamination.

The invention further relates to a method for creating a decontaminated packaging according to the invention comprising the steps of: (a) providing a film according to the invention; (b) forming a packaging comprising the film and containing the objects for medical, pharmaceutical or cosmetic uses; (c) closing the packaging by means of sealing and/or adhesive; (d) exposing the closed packaging to an atmosphere containing a decontaminating gas and/or vapor, optionally followed by purging the decontaminated packaging with a gas in order to remove the decontaminating gas and/or vapor; and (e) hermetically sealing the packaging by activating the adhesive layer in the film by means of energy transmission.

The method according to the invention differs from the prior art in two essential points. Instead of the pure non-woven layers used in the prior art, the present invention uses the film according to the invention for the preparation of the packaging. This packaging is then decontaminated as usual in a gas or steam chamber, optionally followed by a purging with a gas for removal of the decontaminating medium. For example, when the decontamination uses ethylene oxide, the toxic ethylene oxide usually is purged with nitrogen. Hence, the equipment and work flows may remain unchanged up to the point when decontamination has been finished. Additional purging cycles might be necessary to reduce ethylene oxide and ethylene chlorohydrin residuals. Once decontaminated the method according to the invention adds the step of hermetically sealing the packaging by activating the adhesive layer.

As opposed to the prior art, the present invention produces a packaging which is hermetically sealed and consequently has no gas exchange with the environment. This allows for a non-destructive integrity check of the packaging by means of, for example, laser gas analysis techniques like TDLAS (Tunable Diode Laser Absorption Spectroscopy). Without opening the package TDLAS is able to detect gas components like oxygen, which will enter the packaging if there is a puncture, or to measure the composition of the gas inside the package for differences to a defined atmosphere used before closing it. Even if there is some degree of diffusion of, for example, 02 through the bag foil such as LDPE/PET or similar, the flux over time can be calculated based on material properties. Any difference would be visible as a significantly higher concentration of oxygen compared to the intrinsic diffusion. Thus, each packaging can be checked for integrity and indirectly sterility before it is subsequently introduced into the antiseptic areas.

Moreover, the hermetically sealed packaging prevents hydrogen peroxide from entering into the packaging and contaminating the packaged goods during a hydrogen peroxide decontamination step. Hence, there is no risk of deterioration of, for example, a biological medicament which is filled into vials or syringes that have been transported within the packaging.

In an embodiment, the method further comprises between steps d) and e) the step of (f) exposing the decontaminated packaging to an atmosphere containing a protective gas.

This further step aids in two ways. Apart from creating a protective atmosphere within the packaging, this also simplifies the detection of the integrity of the packaging. By purging the packaging and creating a well-defined atmosphere within the packaging, the integrity check can be reduced to a measurement of the gas composition or even a single component of the gas within the packaging. If there is a puncture in the packaging, the gas composition will change which can be detected with great accuracy. For example, the presence of oxygen can be detected very well by means of TDLAS. Hence, a check for the presence of oxygen will reveal a lost integrity of the packaging without having to open it. The protective gas is preferably chosen from nitrogen and argon, which can be used alone or as a predefined mixture.

DETAILED DESCRIPTION

Figure 1:
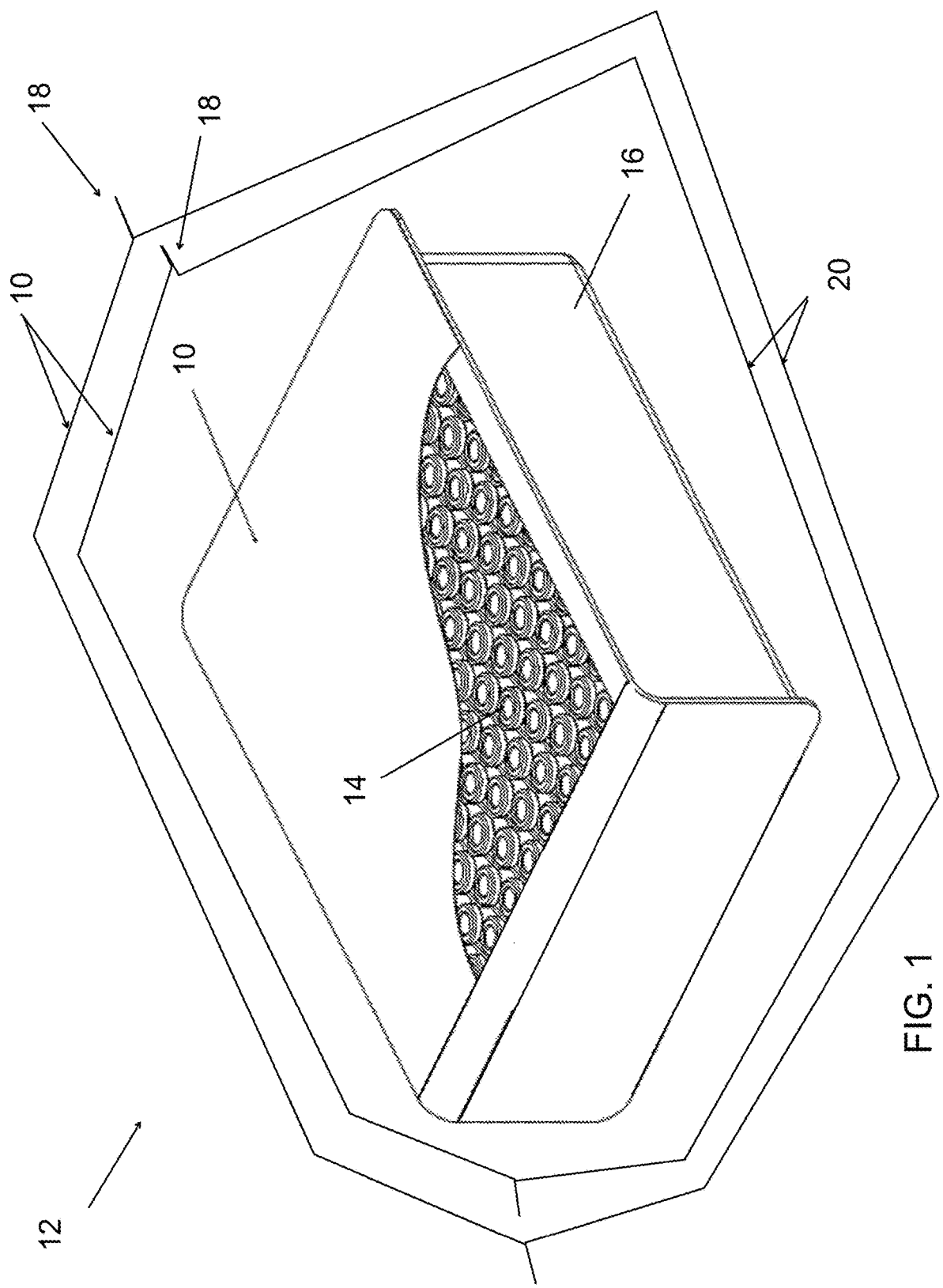
FIG. 1 is a perspective view of an exemplary embodiment of packaging according to the present disclosure.

Referring to FIG. 1, examples of different embodiments of the film (10) according to the invention presented hereafter, a typical packaging (12) for vials (14) has been prepared. The vials (14) have been put in a container (16) sealed with a respective film (10) of the examples. The container (16) can be in the form of a tub with a nest or a tray. Thereafter, the packaging (12) having the container (16) sealed therein can, in some embodiments, be consecutively further been wrapped in two identical bags (18), which have been sealed, each consisting of a respective film (10) of the examples on one side and a high density polyethylene film (20) on the other side.

The packaging (12) of containers (16) have been sterilized by exposure to ethylene oxide in a vacuum chamber for 6 hours at a temperature of 45-60° C. After sterilization the chamber has been purged with nitrogen and as the final step the packages (12) have been exposed to an atmosphere of a mixture of nitrogen and argon. Thereafter the adhesive in the film (2) has been activated in order to hermetically seal the sterilized packages (12). The integrity check has been performed by means of a measurement of the oxygen content within the packages with TDLAS.

Example 1

Figure 2:
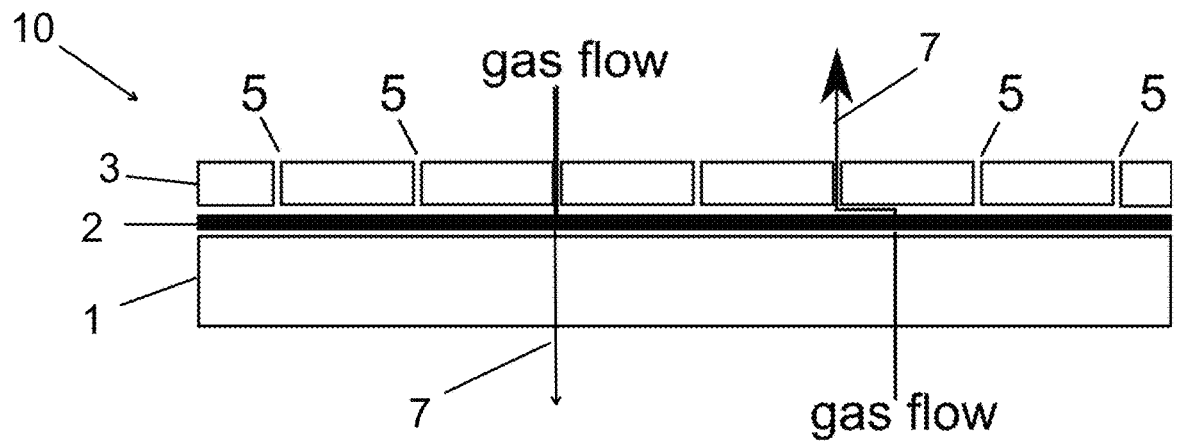
FIG. 2 is a cut-through image of an embodiment with one film layer before activation of the adhesive layer.
Figure 3:
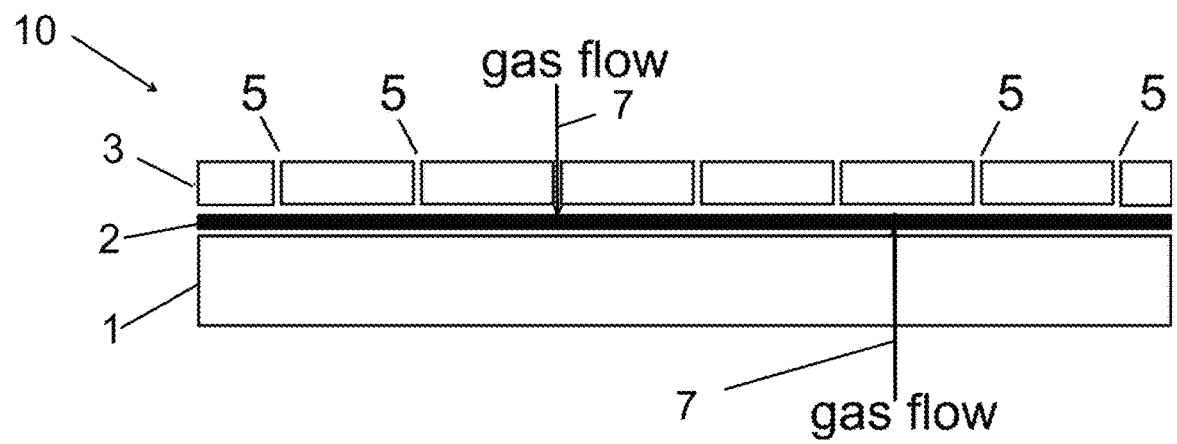
FIG. 3 is a cut-through image of the embodiment of FIG. 2 after activation of the adhesive layer.

The structure of film (10) of Example 1 is shown in FIG. 2 in its non-activated condition and FIG. 3 in its activated condition. In the non-activated condition, film (10) is permeable to the sterilizing agent (7). Conversely, in the activated condition, film (10) is non-permeable to the sterilizing agent (7).

A spunbonded very fine filaments non-woven layer (1) of polypropylene has been laminated to a polypropylene film (3). The polypropylene film (3) has been provided with apertures (5) by means of needling. By offset printing, first a line pattern of an adhesive in the form of a hot melt methacrylate resin has been applied to the film and thereafter a coarse rectangular grid of a polyurethane laminating adhesive containing a UV photoinitiator to form an adhesive layer (2). The two layers (1, 3) have then been laminated under UV irradiation.

For the activation of the adhesive (2), the packaging has been heated by irradiation with an IR lamp in order to melt the hot melt adhesive. Adhesive layer (2) once activated is impermeable for sterilizing gases or vapors (7) to seal apertures (5).

Example 2

Figure 4:
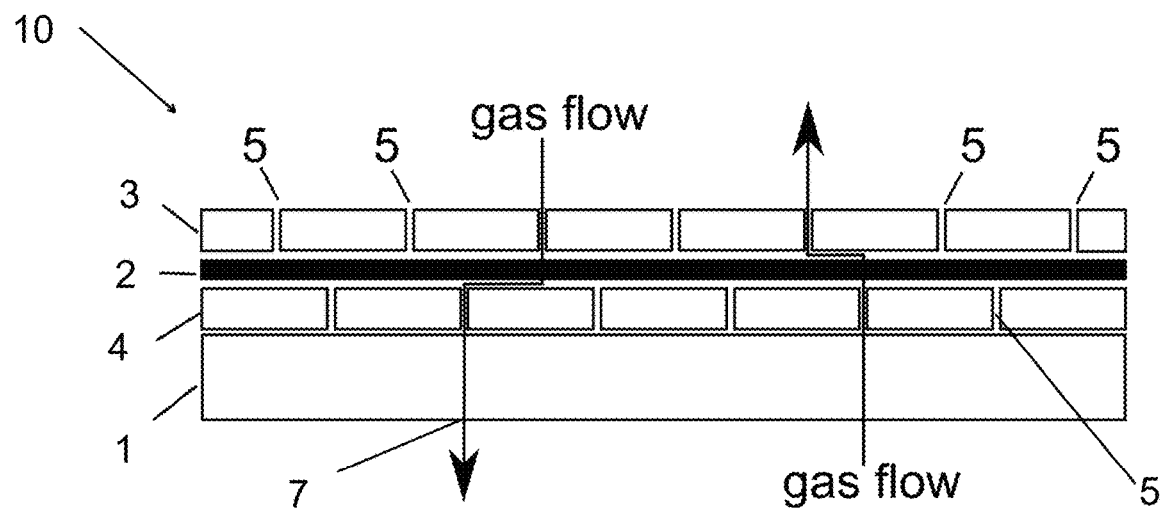
FIG. 4 is a cut-through image of an embodiment with two film layers before activation of the adhesive layer.
Figure 5:
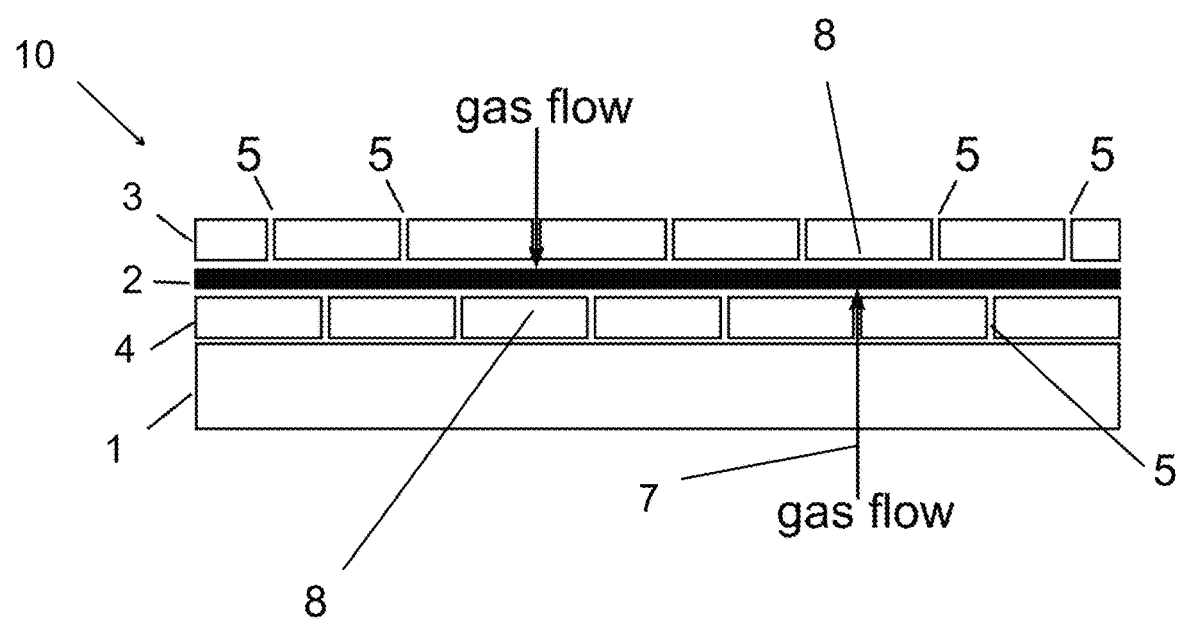
FIG. 5 is a cut-through image of the embodiment of FIG. 4 after activation of the adhesive layer.

The structure of film (10) of Example 2 is shown in FIG. 4 in its non-activated condition and in FIG. 5 in its activated condition. In the non-activated condition, film (10) is permeable to the sterilizing agent (7). Conversely, in the activated condition, film (10) is non-permeable to the sterilizing agent (7).

The innermost layer is the non-woven layer (1). By means of a standard laminating adhesive (not shown in the drawing) the non-woven layer (1) is bonded to a first layer of film (4). The first layer of film (4) is impermeable for sterilizing gases or vapors except for apertures (5) provided therein. The next layer is the activatable adhesive layer (2). And the outermost layer is a second layer of film (3) which is also impermeable for sterilizing gases or vapors except for apertures (5) provided therein.

For the preparation of the film (10), the first and second layers of film (3, 4) have been provided with a comb-like pattern of cuts indicated as the apertures (5) in FIGS. 4-5. In the finished film (10) these patterns of the two layers (3, 4) are arranged such that the combs of apertures (5) are intermeshing. Thus, there is no direct path for the sterilizing agent (7) for entering the packaging. Instead the agent (7) will have to follow a double bent path as shown in FIG. 4. And the apertures (5) in one layer of film (3, 4) are always facing a non-cut film area (8) of the other film (3, 4), which will be able to close the apertures (5) once the activatable adhesive (2) has been activated which will result in a hermetic sealing of the packaging (12). This situation after activation of the adhesive (2) is shown in FIG. 5.

By gravure printing, an ethylene-vinylacetate based hot melt adhesive (not shown) is applied in a coarse dot pattern on the first surface of the first layer of film (4) which is made of high density polyethylene. A non-woven layer (1) of Tyvek® 1073B has then been bonded to the first surface of the first layer of film (4) using heat in a standard laminating procedure. Thereafter, the second surface of the first layer of film (4) has been gravure printed in a line pattern oriented perpendicular to the comb-like cut patterns of apertures (5) with an activatable adhesive (2) in the form of a reactive polyurethane resin containing a UV photoinitiator. Using a solvent based standard laminating adhesive, the second layer of film (3), which is also made of high density polyethylene, has been gravure printed with a grid pattern of apertures (5), which is sized such that it matches the comb-like cut patterns and surrounds them. Thereafter, the second layer of film (3) is laminated onto the adhesive (2) on the first layer of film (4) using a standard wet laminating procedure.

For the activation of the adhesive (2), the packaging (12) consequently has been irradiated with a UV lamp.

Alternatively, using the same structure, the film (10) can also be made with a spunbonded very fine filaments non-woven layer (1) of polypropylene and two polypropylene film layers (3, 4).

REFERENCE NUMBER LIST 1 non-woven layer
2 activatable adhesive
3 layer of film
4 layer of film
5 aperture
7 gas flow of sterilizing agent
8 non-cut area of film facing aperture 5
10 film
12 packaging
14 vials
16 container

What is claimed is:

1. A film for gas or vapor decontaminable packaging applications, comprising in sequence from outside to inside of the film:
a first layer of film being essentially impermeable for the decontaminating gas or vapor, having a first needling, perforation and/or cut pattern;
an adhesive layer which can be activated by energy transmission, covering an entire surface of the first layer; and
a layer of selectively permeable non-woven material being essentially impermeable for microorganisms, wherein the adhesive layer is between the first layer and the layer of selectively permeable non-woven material.

2. The film according to claim 1, further comprising a second layer of film being essentially impermeable for the decontaminating gas or vapor, having a second needling, perforation and/or cut pattern being incongruent with the first needling, perforation and/or cut pattern, and being arranged between the adhesive layer and the layer of selectively permeable non-woven material.

3. The film according to claim 2, wherein the first and second layers of film form a laminated structure or are joined to each other only at parts of their surface.

4. The film according to claim 2, wherein the first and second layers of film form a laminated structure or are joined to each other only at peripheral surface areas.

5. The film according to claim 1, wherein activation of the adhesive layer by energy transmission can be effected through one or more processes selected from a group consisting of heat, UV irradiation, IR irradiation, induction, and microwave irradiation.

6. The film according to claim 1, wherein the adhesive layer is a hot melt heat sealable adhesive system containing additives that are responsive to the energy transmission.

7. The film according to claim 1, wherein the selectively permeable non-woven material is a flash spun plexifilamentary film-fibril structure or a spunbonded very fine filaments non-woven.

8. The film according to claim 1, wherein the selectively permeable non-woven material is made of a material selected from a group consisting of high density polyethylene (HDPE), polypropylene (PP), and polyethylene terephthalate (PET).

9. The film according to claim 1, wherein the first and/or second layers of film comprise a material selected from a group consisting of polyethylene, polypropylene, polyamide 6, polyethylene terephthalate, and blends and/or copolymers thereof.

10. The film according to claim 1, wherein the first and/or second needling, perforation and/or cut pattern is selected from a group consisting of a labyrinth-like pattern, a comb-like pattern, and a stripe pattern.

11. A film for gas or vapor decontaminable packaging applications, comprising:
a first layer of film that is essentially impermeable for gas or vapor, the first layer of film having a first plurality of apertures defined therethrough;
a layer of selectively permeable non-woven material being essentially impermeable for microorganisms; and
an adhesive layer between the first layer of film and the layer of selectively permeable non-woven material, the adhesive layer having a non-activated state and an activated state, the adhesive layer, when in the non-activated state, being permeable to the gas or vapor, and the adhesive layer, when in the activated state, being impermeable to the gas or vapor, the adhesive layer being activated from the non-activated state to the activated state by energy transmission,
wherein the adhesive layer is arranged and configured so that when in the activated state the first plurality of apertures are sealed.

12. The film according to claim 11, further comprising a second layer of film being essentially impermeable for gas or vapor, the second layer of film having a second plurality of apertures defined therethrough, the second layer of film being between the adhesive layer and the layer of selectively permeable non-woven material.

13. The film according to claim 11, wherein the second plurality of apertures are incongruent with the first plurality of apertures.

14. The film according to claim 12, wherein the adhesive layer is arranged and configured so that, when in the activated state, the second plurality of apertures are sealed.

15. A film for gas or vapor decontaminable packaging applications, comprising in sequence from outside to inside of the film:
- a first layer of film being essentially impermeable for the decontaminating gas or vapor, having a first needling, perforation and/or cut pattern;
- an adhesive layer which can be activated by energy transmission, covering the entire surface of a layer underneath;
- a layer of selectively permeable non-woven material being essentially impermeable for microorganisms; and
- a second layer of film being essentially impermeable for the decontaminating gas or vapor and arranged between the adhesive layer and the layer of selectively permeable non-woven material, wherein the first and second layers of film are joined to each other only at peripheral surface areas.

16. The film according to claim 15, wherein the first needling, perforation and/or cut pattern are in a comb-like pattern.

* * * * *